Oct. 31, 1939.  L. A. LONGLEY  2,178,484
CONNECTING ROD AND PISTON ASSEMBLY
Filed July 26, 1938
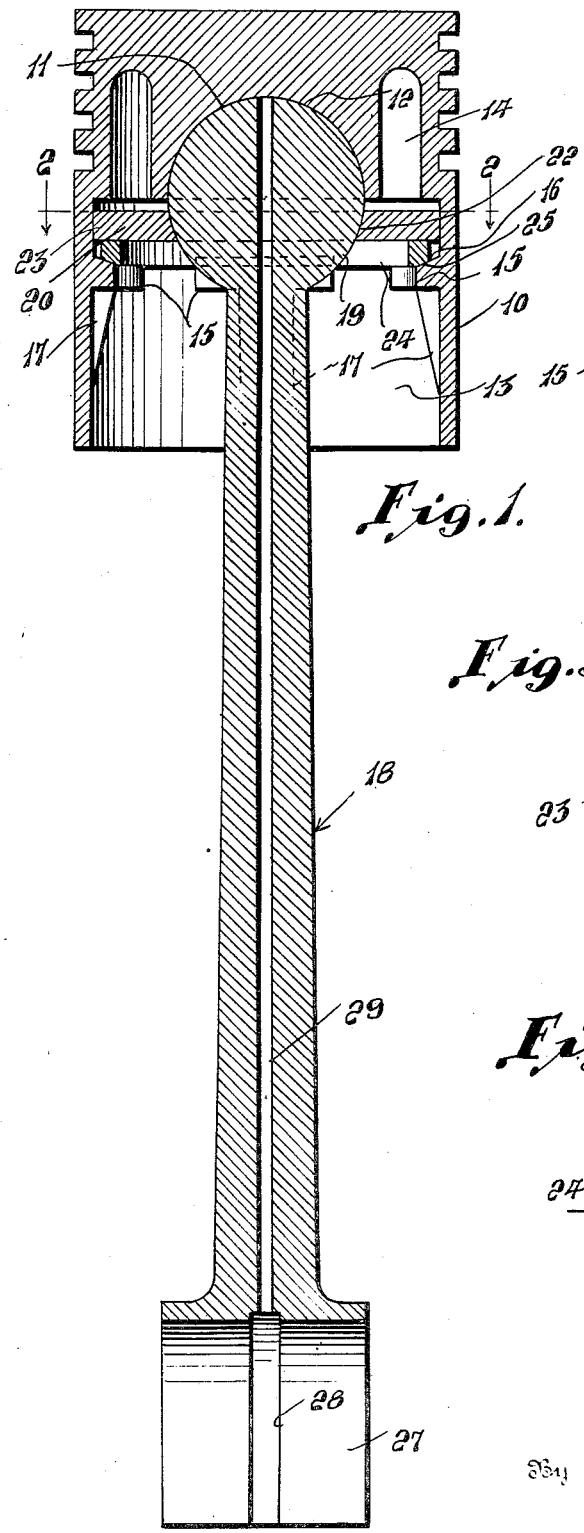
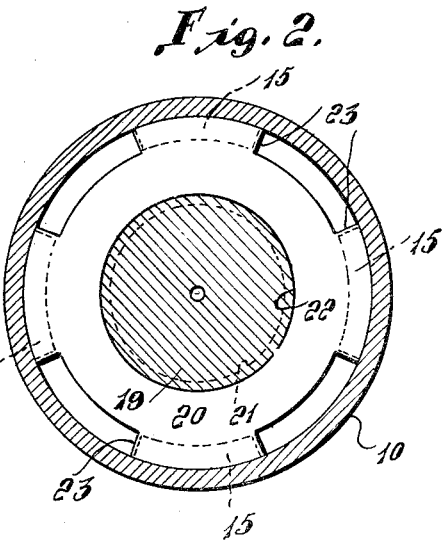
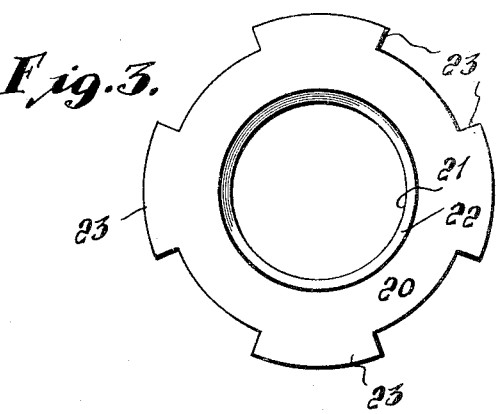
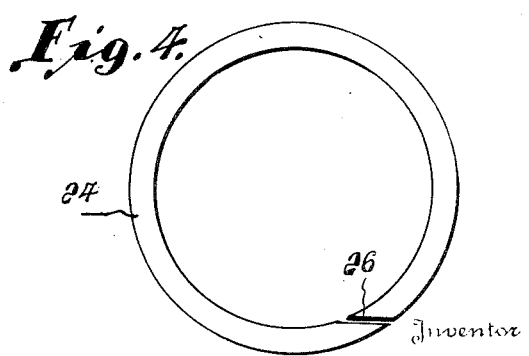
Inventor
Lester A. Longley
By L. F. Randolph
Attorney Patented Oct. 31, 1939

2,178,484

UNITED STATES PATENT OFFICE 2,178,484

CONNECTING ROD AND PISTON ASSEMBLY

Lester A. Longley, Monterey Park, Calif.

Application July 26, 1938, Serial No. 221,409

4 Claims. (Cl. 309—20)

This invention relates to an improved connecting rod and piston assembly for pistons of the reciprocating type.

It is an object of this invention to provide a full floating piston designed to eliminate the use of wrist pins and a defect prevalent in pistons employing wrist pins. More particularly, it is an object of this invention to provide a piston assembly wherein the connecting rod is swivelly mounted relatively to the piston thereby permitting the piston to turn relatively to the cylinder and to the connecting rod thereby preventing the cylinder wall from wearing unevenly.

A further object of the invention is to provide a connecting rod and piston assembly of simple construction capable of being readily assembled resulting in a more flexible assembly enabling the parts to align themselves relatively to each other and to the drive shaft automatically.

Other objects and advantages of the invention will hereinafter become more fully apparent from the following description of the drawing which illustrates a preferred form of the invention, and wherein:

Figure 1 is a longitudinal central vertical sectional view of the piston and connecting rod assembled, Figure 2 is a cross sectional view taken on the line 2—2 of Figure 1, Figure 3 is a top plan view of the retaining ring, and Figure 4 is a similar view of the expansion ring.

Referring more particularly to the drawing wherein like reference characters designate like or corresponding parts throughout the different views, 10 designates generally the piston including the head 11 which is provided with the concave recess 12 in its depending end which opens downwardly to communicate with the hollow lower portion 13 of the piston 10. Head 11 is provided with an annular recess 14, between recess 12 and the periphery of the piston which opens downwardly into portion 13 and which forms an air space or chamber to assist in cooling the piston head 11. As seen in Figure 1, piston 10 is provided with a plurality of shoulders 15 disposed in annular spaced relationship and which project inwardly into the hollow portion 13. Shoulders 15 are provided with a bevelled or downwardly inclined upper surface 16 and with a tapered lower portion 17. A connecting rod, designated generally 18, is provided with a ball or spherical shaped joint at its upper end, designated 19, the upper half of which is adapted to engage the concave recess 12. A retaining ring 20, as best seen in Figure 3, is provided with an opening 21, disposed centrally thereof, which loosely engages the connecting rod 18 for mounting ring 20 thereon, and an annular bevelled face 22 opening upwardly and surrounding the opening 21. Ring 20 is also provided with a plurality of spaced outwardly extending ears or lugs 23. The ring 20 is inserted in piston 10 through its open bottom, after the ball 19 has been positioned in the recess 12, and the ears 23 are guided by the portions 17 to pass upwardly between shoulders 15 and into the position, as seen in Figure 1, with the lower part of the ball 19 projecting through opening 21 and with the bevelled portion 22 in engagement with a portion of the periphery of the ball.

A split expansion ring 24, as best seen in Figure 4, is provided with a bevelled lower face 25, as seen in Figure 1, which is adapted to rest on the inclined portion 16 of shoulders 15 to support ring 20 in engagement with ball 19. Should any wear result in recess 12, ball 19 or the bevelled face 22, so as to permit play between the parts, ring 24 which is of the expansion type and which is split at 26 will move outwardly and upwardly due to the bevelled faces 16 and 25 to raise the retaining ring 20 to take up the play, thereby eliminating any looseness between the parts caused by wear.

At the opposite end of connecting rod 18 is a bearing 27 having an annular groove 28 extending around its bearing face and opening inwardly to receive and convey a lubricant from a conventional drilled crank shaft, not shown, to a passage 29 which extends longitudinally through the shank of the connecting rod and through the ball 19 to lubricate the periphery of the ball and its bearing surfaces 12 and 22.

From the foregoing it will be obvious, that a piston and connecting rod assembly has been provided wherein the piston is swivelly as well as pivotally mounted on the connecting rod thereby permitting it to turn relatively thereto and consequently to turn in the cylinder bore so as to prevent said bore from wearing unevenly thus eliminating the piston slap. The assembly also provides means in the form of the ring 24 to take up any play caused by wear between the piston socket and the connecting rod joint to retaining a firm connection between the parts. A further description of the operation of the device is considered unnecessary.

Various modifications and changes are contemplated and may be made, as the drawing is only intended to illustrate a preferred form of the invention, and the right is expressly reserved to make such variations and changes as do not depart from the spirit and scope of the invention as hereinafter defined by the appended claims.

I claim as my invention:

1. In a device of the class described, a piston having a head provided with a concave recess in its under side, a piston rod having a ball joint to engage said recess, shoulders formed in spaced relationship in said piston beneath the head, a retaining ring having a bevelled opening to engage the lower part of said ball joint and a plurality of outwardly projecting ears movable relatively to the head between said shoulders, and a spring ring supported by said shoulders and engaging the ears to support said retaining ring in engagement with the ball joint.

2. A piston and connecting rod assembly comprising a piston having a socket joint including a concave recess in the piston head, and a retaining ring having a bevelled opening to cooperate therewith and adapted to retain a ball joint of a connecting rod in position therein, shoulders projecting inwardly of said piston beneath the head having bevelled tops, spaced ears projecting outwardly from the ring and movable between the shoulders and an expansive spring ring having a bevelled under side to engage said bevelled tops, said ears engaging the upper edge of the spring ring to support said retaining ring and to urge it upwardly against the ball joint.

3. In a piston and connecting rod assembly, a piston having a head provided with a concave recess in its under side, said piston being provided with a plurality of spaced inwardly extending shoulders having downwardly and inwardly inclined upper surfaces, a retaining ring having a bevelled opening, a connecting rod having a ball joint to engage said recess and the opening of said retaining ring, and an expansion spring ring having a bevelled under side to engage the inclined portions of said shoulders to support the retaining ring, said expansion ring urging the retaining ring upwardly into engagement with the ball joint, and said retaining ring having spaced outwardly projecting ears movable between said shoulders to engage the expansion ring.

4. A piston and rod assembly comprising a piston having a head provided with a concave recess in its under side, said piston being provided with a plurality of inwardly extending shoulders disposed beneath said head and having inclined upper faces, a connecting rod having a ball joint sized to fit said recess, a passage extending longitudinally through the rod and adapted to convey a lubricant to said ball joint, a retaining ring having a bevelled opening to engage the lower part of said ball joint and having outwardly extending spaced ears or lugs shaped to pass between said shoulders, and an expansion ring having a bevelled under side to engage the inclined surface of said shoulders to support the retaining ring in engagement with the ball joint and to urge it upwardly to take up any slack due to wear.

LESTER A. LONGLEY.